(12) United States Patent
Brooker et al.

(10) Patent No.: US 8,738,935 B1
(45) Date of Patent: May 27, 2014

(54) VERIFIED ERASURE OF DATA IMPLEMENTED ON DISTRIBUTED SYSTEMS

(75) Inventors: Marc J. Brooker, Seattle, WA (US); David R. Richardson, Seattle, WA (US); Madhuvanesh Parthasarathy, Renton, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/434,693

(22) Filed: Mar. 29, 2012

(51) Int. Cl.
*G06F 12/14* (2006.01)

(52) U.S. Cl.
USPC .......................................................... 713/193

(58) Field of Classification Search
None
See application file for complete search history.

(56) References Cited

U.S. PATENT DOCUMENTS

| | | |
|---|---|---|
| 2010/0185843 A1 | 7/2010 | Olarig et al. |
| 2010/0299555 A1 | 11/2010 | Jepson et al. |
| 2010/0325736 A1 | 12/2010 | Sadovsky et al. |
| 2011/0072209 A1 | 3/2011 | Lund et al. |
| 2011/0258411 A1 | 10/2011 | Sato |
| 2011/0307724 A1* | 12/2011 | Shaw et al. .................... 713/323 |
| 2012/0278529 A1 | 11/2012 | Hars et al. |
| 2013/0160139 A1* | 6/2013 | Goel et al. ....................... 726/27 |

* cited by examiner

*Primary Examiner* — Brandon Hoffman
(74) *Attorney, Agent, or Firm* — Kilpatrick Townsend & Stockton LLP

(57) ABSTRACT

Systems, methods and related processes for securely erasing and/or rendering permanently inaccessible data stored on storage systems securely erased is described. Such storage systems may, in some aspects, integrate hardware capable of secure erasure. In some aspects, a cryptographically-based system is utilized.

24 Claims, 7 Drawing Sheets

VERIFIED ERASURE OF DATA IMPLEMENTED ON DISTRIBUTED SYSTEMS

CROSS-REFERENCE TO RELATED APPLICATIONS

This application incorporates by reference for all purposes the full disclosure of co-pending U.S. patent application Ser. No. 13/434,580, filed concurrently herewith, entitled "VERIFIED HARDWARE-BASED ERASURE OF DATA ON DISTRIBUTED SYSTEMS".

BACKGROUND

As data storage on distributed systems becomes increasingly popular due to their inherent scalability, performance, security and other advantages, customers are relying more on such systems to store sensitive and/or important data. However, the operation of such systems often involve the creation and persistence of multiple copies of data across the distributed systems, and the verifiable deletion of all such data copies can be difficult or complex to manage. This can be problematic when customers rely on distributed systems to persist, then securely remove access to, crucial or sensitive data in order to, for example, prevent corporate espionage or identity theft. There is thus a need for a scalable, easily implementable method to securely, permanently and/or verifiably remove such data from distributed systems that may contain multiple copies of the data across a large number of redundant storage nodes.

BRIEF DESCRIPTION OF THE DRAWINGS

Various embodiments in accordance with the present disclosure will be described with reference to the drawings, in which.

DETAILED DESCRIPTION

Figure 1:
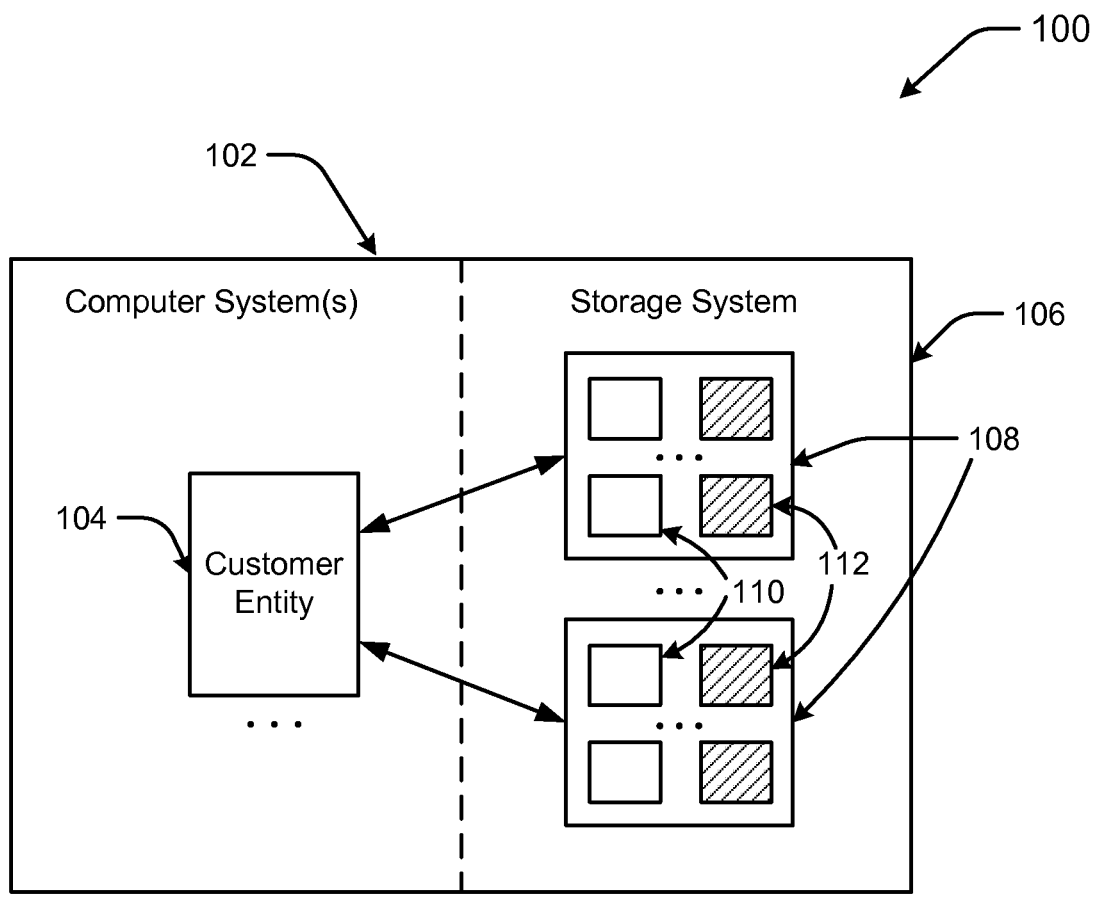
FIG. 1 illustrates an example of an environmental configuration that can be used in accordance with at least one embodiment.

Systems and methods in accordance with various embodiments of the present disclosure may overcome one or more of the aforementioned and other deficiencies experienced in conventional approaches to providing access to data in an electronic environment. In particular, various embodiments provide for positive access control over data stored on a storage system. For example, a customer entity, connected to a storage system, may initiate a process or multiple processes to cause the storage system, or entities connected thereto, to verifiably destroy or otherwise remove access to the customer entity's data stored thereon. Such processes may include the use of inherent secure erasure capabilities of the storage devices that comprise the storage system. Such processes may, in addition or otherwise, include more general methods for verifiably, positively and/or permanently removing access to such data, as well as provide information to customer entities that indicates the disposition of the data.

In some embodiments, a customer entity connects with and stores data upon a storage system, which may comprise any number of storage nodes that each contain one or more hardware storage devices. The customer entity may request, from the storage system or some other entity, the ability to securely, verifiably and/or permanently render inaccessible the stored data, as well as any attendant copies of such data created and/or persisted during operation. Such a capability may be granted by either leveraging analogous "secure erase" abilities in the constituent storage devices or in some other appropriate manner, such as encrypting the data with a cryptographic key and tracking the location or other disposition of the key. It is contemplated that a combination of approaches may be used to enable the ability.

When the ability to render stored data inaccessible is enabled, customer entities, in some embodiments, may initiate a request or command to render the stored data inaccessible. In some embodiments, the request may be processed in accordance with the approach or combination of approaches used to initially enable the ability. For example, if the ability to render data inaccessible is enabled by locating or relocating the customer entity's data upon a set of hardware storage devices that have an inherent availability to securely erase or otherwise permanently disable access to data stored thereon, a request to render such data permanently inaccessible may be processed by, e.g., invoking the inherent secure erase ability of at least a subset of the hardware storage devices upon which the customer entity's data is stored. As another example, if the ability to render data inaccessible is enabled by encrypting the data stored upon the storage system with a cryptographic key, the request to disable data access may be processed by "throwing away the key," e.g. permanently erasing, disabling or otherwise removing access to the key such that the encrypted data can no longer be decrypted, at least in any practical way. As will be appreciated, the manner in which a request to render data inaccessible is processed depends, at least in part, on the manner in which the ability to render data inaccessible is enabled.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

FIG. 1 illustrates an example of an environment 100 for implementing aspects in accordance with various embodiments. In this example, one or more computer systems 102 are used to implement one or more customer entities 104, which connect to one or more storage nodes 108 of storage system 106. The storage nodes consist of one or more hardware storage devices 110, a secure-erase capable subset 112 of which are inherently capable of securely erasing or disabling access to data stored thereon. In some embodiments, the one or more computer systems consist of a plurality of networked computing resources in a distributed computing system. The networked computing resources may, in some embodiments, be hardware-based, software-based, dedicated, virtualized and/or configured in any appropriate fashion. In some embodiments, the customer entities are instances of the computer systems, and may correlate with actual hardware of the computer systems, a virtualized abstraction thereof, or some combination. In some embodiments, the customer entity may comprise the entirety of the computer system. As denoted by the ellipsis, in some embodiments, the computer system may contain, control, and/or be connected to any number of customer entities.

The customer entity 104 may connect with the storage system 106 by any appropriate method or combination of methods, physical or otherwise. Such connection methods may use any appropriate standard or proprietary methodology. For example, the customer entity may be connected to the storage system by virtue of the storage system being part of the computer system, as denoted by the vertical dashed line. As another example, the customer entity may connect to the storage system via an encrypted network connection such as a virtual private networking (VPN) tunnel, which may or may not be cryptographically protected using the same or different methodology that is used, in some embodiments, to encrypt stored data. In some embodiments, such an encrypted network connection may be administered by an entity of the computer system, an entity of the storage system, some combination, or an entity unconnected with either (e.g., a standalone encryption box). The storage system may, in some embodiments, may itself be an entity of the computer system. In alternate embodiments, the storage system may be a separate entity from the computer system. The storage system may contain any number of storage nodes 108, which, in some embodiments, are interconnected via a network or data connection such that the nodes may communicate, by any appropriate method, with one another. Each storage node contains at least one storage device 110. In some embodiments, the storage nodes may be discrete storage servers. In some embodiments, the storage nodes may be virtualized storage volumes that abstract an arbitrary number of storage resources, such as storage devices. In some embodiments, the virtualized volumes span across a plurality of storage servers, and, for example, comprise only storage devices with specific qualities or characteristics. In some embodiments, the qualities or characteristics include an inherent ability to encrypt, secure and/or securely disable access to data stored on the storage device.

In some embodiments, as previously mentioned, a subset of the storage devices 110 may include devices 112 that are capable of securely and/or permanently erasing or otherwise disabling access to data stored thereon. In some embodiments, the data access disabling capability of the aforementioned subset of storage devices functions by, upon receipt of a routine programmed in the firmware of the device, deleting and/or overwriting at least a portion of the data stored thereon. In some embodiments, the aforementioned subset of devices include self-encrypting storage devices, which in turn may include (but are not limited to) self-encrypting hard disk drives and/or solid state disk drives (SSDs) that support a hardware-implemented, cryptographically based "secure erase" functionality, as is known to those in the art. In some embodiments, such self-encrypting devices are capable of irreversibly removing access to data stored thereon by internally encrypting all data, either in operation or upon command, and physically erasing (e.g., cryptographically zeroizing) or otherwise disrupting the cryptographic key that is necessary to decrypt the data. In some embodiments, such self-encrypting devices are only capable of securely erasing all data on the device using built-in secure erase functionality. In some embodiments, the self-encrypting devices are modified, for example by modifying the firmware or hardware, to support the aforementioned secure erase functionality on a more granular basis, e.g. for each of a plurality of regions of the device, such that data, on the regions for which the secure erase functionality is not invoked, remains unaffected. Although only some embodiments include the use of self-encrypting devices that have the capability of irreversibly removing access to data, for convenience of example, self-encrypting devices will be used as representative of such devices in the description of FIG. 1.

In some embodiments, the customer entity 104 will request, from the storage system 106, the ability to securely, verifiably or permanently remove (or remove access to) data stored, on behalf of the customer entity, on the storage system. In some embodiments, such an ability is a default ability of the storage system and is operable upon all or part of the data stored thereon. For ease of example, the aforementioned ability(ies) will be collectively referred to as a secure erasure ability, although such a label is not intended to be limiting in any way. Some embodiments enable the secure erasure ability by allocating a storage volume, to which the customer entity is configured to store data it wishes to be subject to the secure erasure ability, that consists only of self-encrypting or similar devices. In some embodiments, when unencrypted data stored on behalf of the customer entity already exists on the storage system at the time a request to enable the secure erasure ability is made by the customer entity, some or all of the unencrypted data is moved to such a volume. In some embodiments, self-encrypting or similar devices requisitioned as part of the volume are allocated, in whole or in part (if the drive supports is modified to support per-region secure erasure as previously described), exclusively to the customer entity to which the volume is attached. In such embodiments, multiple self-encrypting devices may be used to create the volume without the possibility of losing data of other customers stored upon such self-encrypting devices, should the customer entity invoke the secure erase ability and destroy or render inaccessible its data stored on such devices.

In some embodiments, the customer entity requests, or authorizes a request for, data stored upon the storage system to be securely, verifiably or permanently removed or rendered inaccessible. In some embodiments, the customer entity or the storage system (with the authorization of the customer entity) automatically issues the request when disconnecting or detaching from the storage system or an entity thereof, such as a storage volume. In some embodiments where the data is located upon a volume mapped entirely to self-encrypting or similar storage devices as previously discussed, such a request is serviced by invoking an inherent secure erase or similar ability of the devices, also as previously discussed. The invocation of such an ability may, for example, involve the submission of a specific, device-supported secure erase command to some or all of the devices in the volume, such as secure erase-related commands in the Advanced Technology Attachment command set. The submission of such commands to the volume or self-encrypting or similar storage devices may be made by the connected customer entity, the storage system, the computer system, or any appropriate constituent entity. It is contemplated that in embodiments where the customer entity's data resides across a plurality of self-encrypting devices, an appropriate entity, such as the storage system and/or the customer entity, is configured to track every storage device upon which the customer entity's data has been stored, and upon receiving a customer entity request to invoke the secure erasure capability on the data, send analogous secure erase or similar commands to each storage device thus tracked.

In some embodiments, when the invocation of the secure erasure ability is not possible within a period of time after the request is made, the request or any related commands are queued, in part or whole, for processing or execution at a later time when such processing or execution becomes possible. For example, when one or more storage nodes or storage devices upon which a customer's data resides is unavailable (e.g., due to hardware failure, network interruptions or the like) at the time a secure erasure request is made, the storage system may process the request to send secure erase commands to other available storage devices storing the customer's data, and queue the secure erase commands for execution when the storage devices and/or notes are online. In some embodiments, the queued secure erasure requests and/or related commands are queued such that the commands and requests related to the secure erasure of the stored data are submitted to the storage system, storage nodes and/or storage devices before any other request, including other queued requests. In such embodiments, the customer entity may thus be guaranteed, to a certain extent, that their data cannot be accessed even when systems, nodes or devices previously unavailable at the time of the secure erasure request later become available.

In some embodiments, once the data has been verifiably destroyed or made permanently inaccessible, information relating to the data's disposition is made available to the customer entity. The provision of such information is optionally preceded by any test appropriate for the level of verifiability required or requested. In some embodiments, the customer entity is notified when its secure erasure request is received. In some embodiments, the notification includes verbiage that indicates a guarantee, appropriate to the methodology that was or will be used to destroy or render the data permanently inaccessible, that the data is or will verifiably be disposed of. In some embodiments, the notification is backed by service level agreement or similar guarantee, and may include information that enables the customer entity to independently verify the disposition of the data (e.g., command responses, from the self-encrypting storage devices, to issued secure erase commands).

Figure 2:
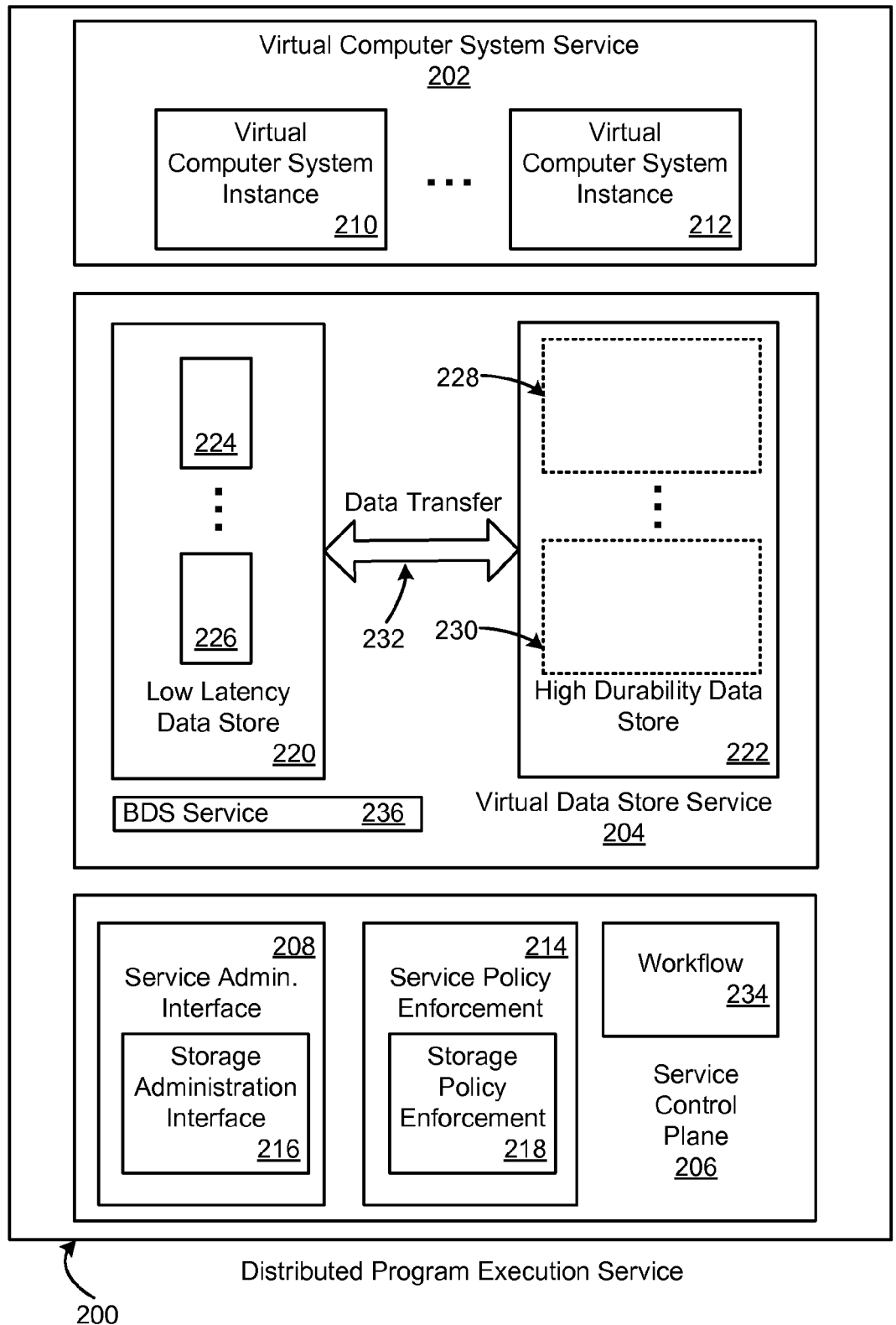
FIG. 2 illustrates an example of an environment that can be used in accordance with at least one embodiment.

In at least one embodiment, one or more aspects of the environment 100 may incorporate and/or be incorporated into a distributed program execution service. FIG. 2 depicts aspects of an example distributed program execution service 200 in accordance with at least one embodiment. The distributed program execution service 200 provides computing services, including a virtual computer system service 202 and a virtual data store service 204, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers, one or more data stores such as the storage system 106 of FIG. 1, as well as communication bandwidth in the interlinking network. The computing resources managed by the distributed program execution service 200 are not shown explicitly in FIG. 2 to emphasize an independence of the computing services from the computing resources that implement them. However, in some embodiments, the computing services may correspond to actual resources rather than being virtualized.

The distributed program execution service 200 may utilize the computing resources to implement the computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the computing services. In some embodiments, the service control plane may be implemented as a virtual computer system instance. The service control plane 206 may include a service administration interface 208. The service administration interface 208 may include a Web-based user interface configured at least to enable users and/or administrators of the virtualized computing services to provision, de-provision, configure and/or reconfigure (collectively, "provision") suitable aspects of the computing services. For example, a user of the virtual computer system service 202 may provision one or more virtual computer system instances 210, 212 such as the customer entity 104 of FIG. 1. The user may then configure the provisioned virtual computer system instances 210, 212 to execute the user's application programs. The ellipsis between the virtual computer system instances 210 and 212 indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or Web-based service interfaces. In at least one embodiment, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement.

A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 208. As another example, a policy enforcement workflow may be created from a policy enforcement workflow template configured with parameters by the service policy enforcement component 214.

The workflow component 234 may modify, further specify and/or further configure established workflows. For example, the workflow component 234 may select particular computing resources of the distributed program execution service 200 to execute and/or be assigned to particular tasks. Such selection may be based at least in part on the computing resource needs of the particular task as assessed by the workflow component 234. As another example, the workflow component 234 may add additional and/or duplicate tasks to an established workflow and/or reconfigure information flow between tasks in the established workflow. Such modification of established workflows may be based at least in part on an execution efficiency analysis by the workflow component 234. For example, some tasks may be efficiently performed in parallel, while other tasks depend on the successful completion of previous tasks.

The virtual data store service 204 may include multiple types of virtual data store such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. In some embodiments, the high durability data store may maintain one or more data sets 228, 230, with the ellipsis between data sets 228 and 230, similarly to described above, indicating support for any suitable number of data sets. In some embodiments, the data sets 228, 230 correspond to captures, for archival purposes, of data sets 224 and 226, respectively. In some embodiments, data sets 228, 230 in the high durability data store may be accessed directly by the virtual computer system instances 210, 212. Although each component of the distributed program execution service 200 may communicate utilizing the underlying network, data transfer 232 between the low latency data store 220 and the high durability data store 222 is highlighted in FIG. 2 because, in some embodiments, the contribution to utilization load on the underlying network by such data transfer can be significant.

For example, the data sets 224, 226 of the low latency data store 220 may be virtual disk files (i.e., file(s) that can contain sequences of bytes that represents disk partitions and file systems) or other logical volumes. The low latency data store 220 may include a low overhead virtualization layer providing access to underlying data storage hardware, which, in some embodiments, includes the storage nodes 108 and/or the constituent storage devices 110, 112 of FIG. 1. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjoint. In a specific embodiment, the low latency data store 220 could be a Storage Area Network target or the like. In an embodiment, a physical computer system that hosts the virtual computer system instance 210, 212 can send read/write requests to the SAN target.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual storage volumes. Access by the virtual computer system instances or clients to such virtual storage volumes may also be dependent on the validity of the virtual computer system instances or clients.

Data stores in the virtual data store service 204, including the low latency data store 220 and/or the high durability data store 222, may be facilitated by and/or implemented with a block data storage (BDS) service 236, at least in part. The BDS service 236 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 236 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 236. The high durability data store 222 may work with sets of data that are large relative to the data blocks manipulated by the BDS service 236. The high durability data store 222 may be implemented independent of the BDS service 236, for example, with distinct interfaces, protocols and/or storage formats. In some embodiments, the functionality of the BDS service, or the BDS service itself, may comprise a subset of the resources of a virtual computer system instance 210, 212 or client 102, rather than reside in a part of the virtual data store service 204 or storage system 106.

Figure 3:
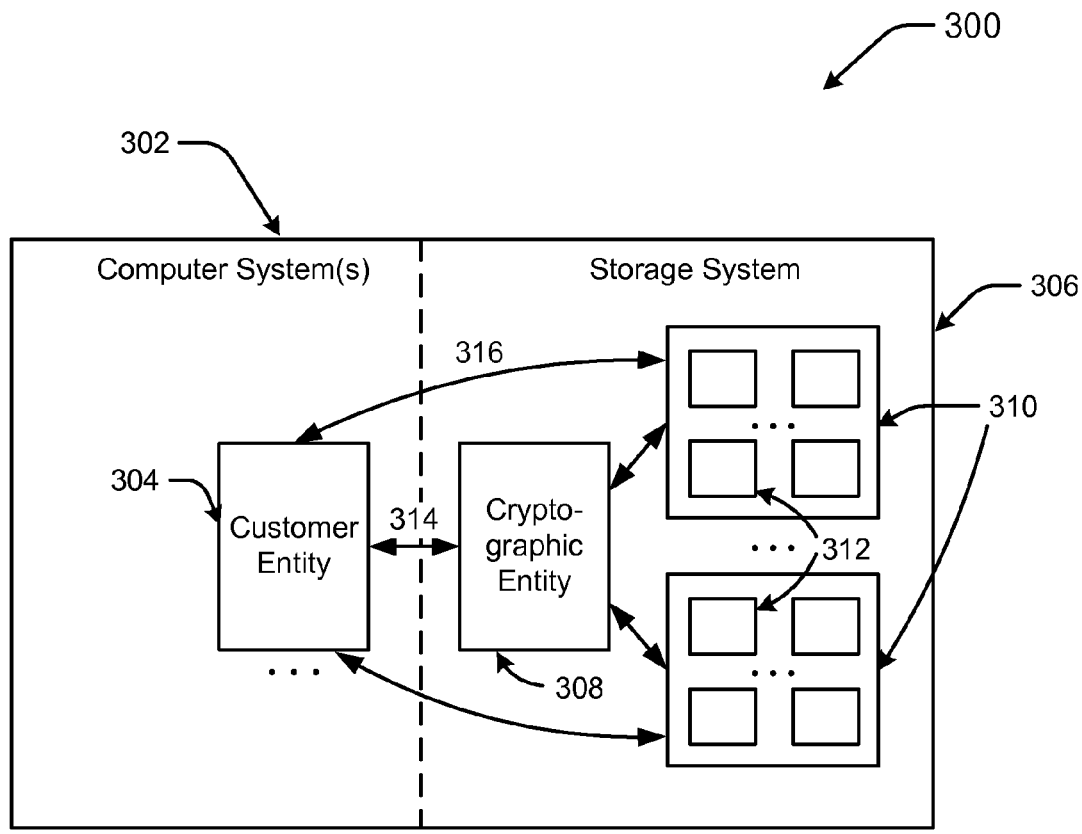
FIG. 3 illustrates an example of an environmental configuration that can be used in accordance with at least one embodiment.

FIG. 3 illustrates an example of an environment 300 for implementing aspects in accordance with various embodiments. In this example, one or more computer systems 302 are used to implement one or more customer entities 304, which connect to one or more storage nodes 310 of a storage system 306 via data connections 316. The computer systems, customer entity and storage system are, in some embodiments, similar to the corresponding entities described in connection with at least FIG. 1. The storage nodes 310 are comprised of one or more storage devices 312, which in some embodiments are similar to the storage nodes 108 and storage devices 110, respectively, as discussed in connection with at least FIG. 1. In some embodiments, the customer entity also communicates, by a data connection 314, with a cryptographic entity 308. The cryptographic entity is, in some embodiments, also connected to the storage nodes, or at least some aspect of the storage system. In some embodiments, the cryptographic entity generates one or more cryptographic keys that are operable to encrypt and/or decrypt some or all data stored on the storage system. In some embodiments, the algorithm used to generate the keys is cryptographically strong, i.e. resistant to cryptographic attack, or at least impracticable to decode for, e.g., unauthorized users without knowledge of the specific scheme employed to generate the keys, at the time the cryptographic key is created. Such cryptographically strong algorithms may include, for example, Advanced Encryption Standard (AES), Blowfish, Data Encryption Standard (DES), Serpent or Twofish, and depending on the specific implementation selected, may be either asymmetric or symmetric key systems. The cryptographic entity may be a hardware device, an application module, or some combination thereof. In embodiments where the cryptographic entity is at least partly an application module-based implementation, the cryptographic entity may be implemented by the computer system(s), the storage system, computing resources controlled by third parties to the computer system(s) and/or the storage system, or any constituent entity thereof. In embodiments where the cryptographic entity is hardware or partly hardware-based, the cryptographic entity may be implemented by the provider of the computer system(s), a user of the customer entity, or a third party to the computer system provider and/or the customer entity user. It is complemented that the cryptographic entity may include multiple constituent cryptographic entities in any implementation combination herein discussed. As a result, the nature and quantity of data connection(s) between the customer entity and the cryptographic entity, as well as the data connection(s) between the cryptographic entity and aspects of the storage system, may vary, depending at least in part on the specific cryptographic entity implementation used.

In some embodiments, as previously discussed, the cryptographic entity is operable to generate cryptographic keys for encrypting and/or decrypting stored data. In some embodiments, the cryptographic entity is further operable to serve as an ingress/egress point for data on the storage system, wherein each customer entity data request includes a cryptographic entity-generated key, the key being required for the customer entity to obtain or write the data to and/or from the storage system. In some embodiments, the cryptographic entity is not directly in the data path between the customer entity and the storage system, and instead generates keys to be obtained by the customer entity and aspects of the storage system. In such embodiments, the customer entity uses at least one of the generated keys to obtain direct access to data stored on the storage system. For example, the customer entity may submit data requests, which include an obtained key or keys, to the storage system, which validates the customer entity-submitted key against a matching or analogous key obtained from the cryptographic entity. In some embodiments, the cryptographic entity may regenerate a new set of cryptographic keys periodically or at random, such that at least the customer entity must periodically obtain the new set of cryptographic keys to retain continued access to data stored on aspects of the storage system. In some embodiments, two cryptographic keys are generated, one each for the customer entity and at least an aspect of the storage system. In some embodiments where two cryptographic keys are generated, both keys are required to access the data. In some embodiments, the cryptographic entity generating the key(s) and the entity responsible for persisting the key(s) differ(s). For example, a cryptographic entity outside of the customer entity may generate a key used to encrypt and/or decrypt data stored on the storage system, but the key is provided to and persisted by the customer entity.

In some embodiments, similarly to that which is described in connection with at least FIG. 1, the customer entity may request, from the storage system, the ability to securely, verifiably or permanently remove (or remove access to) data stored, on behalf of the customer entity, on the storage system, collectively referred to as a "secure erasure ability," similarly to that which was previously mentioned. Some embodiments allocate a new volume that are encrypted using one or more keys generated in a manner previously discussed and, optionally, move existing customer entity data from previous, unencrypted volumes to the encrypted volume, necessarily encrypting the moved data in the process. In alternate embodiments, an existing volume, which may or may not contain data, is encrypted using one or more keys as previously discussed, without the need for creating a new volume or other abstraction of the storage system constituents to enable the secure erasure capability. As previously alluded to, the key(s) may be persisted anywhere that is readily accessible and verifiably cryptographically zeroizable. In embodiments where a customer entity connects indirectly or directly to a plurality of storage devices and/or storage nodes, any number of keys may be used to encrypt data stored upon the plurality of devices and/or nodes, although it is generally preferred to keep the quantity and locational diversity of such keys to a minimum, so as to ease tracking of the keys and increase the verifiability of any subsequent request to remove access to the data, as will be discussed below.

In some embodiments, the customer entity requests, or authorizes a request for, data stored upon the storage system to be securely, verifiably and/or permanently removed and/or rendered inaccessible, similarly to as discussed in connection with at least FIG. 1. Such requests, for ease of example, are herein referred to as "secure erasure requests." In some embodiments, such secure erasure requests may be received by any entity along the data path, including aspects of the computer system (including the customer entity), aspects of the storage system, and/or the cryptographic entity. In some embodiments, the requests are serviced by cryptographically zeroizing, erasing, or otherwise permanently disrupting a cryptographic key required to decrypt the stored data, in all locations in which it is persisted. For example, if two cryptographic keys are required to access and/or decrypt stored data, the permanent loss of one in all locations in which it is persisted would be effective to permanently disable access to the stored data.

In some embodiments, in a manner similar to that which is discussed in connection with FIG. 1, when the invocation of the secure erasure ability is not possible within a period of time after the secure erasure request is made, the request or any related commands are queued, in part or whole, for processing or execution at a later time when such processing or execution becomes possible. For example, when a key persister is unavailable (e.g., due to hardware failure, network interruptions or the like) at the time a secure erasure request is made, the request to zeroize the key is held until such time as the key persister is again able to manipulate the key. In some embodiments, the queued secure erasure requests and/or related commands are queued such that the commands and requests related to the secure erasure of the stored data are executed before any other request, including other queued requests. In such embodiments, similarly to that which is described in FIG. 1, the customer entity may thus be offered a guarantee commensurate with the implementing entity's certainty that the data is, in fact, permanently inaccessible. In some embodiments, notifications and other information relating to the data's disposition is made available to the customer entity, similarly to described in connection with FIG. 1.

Figure 4:
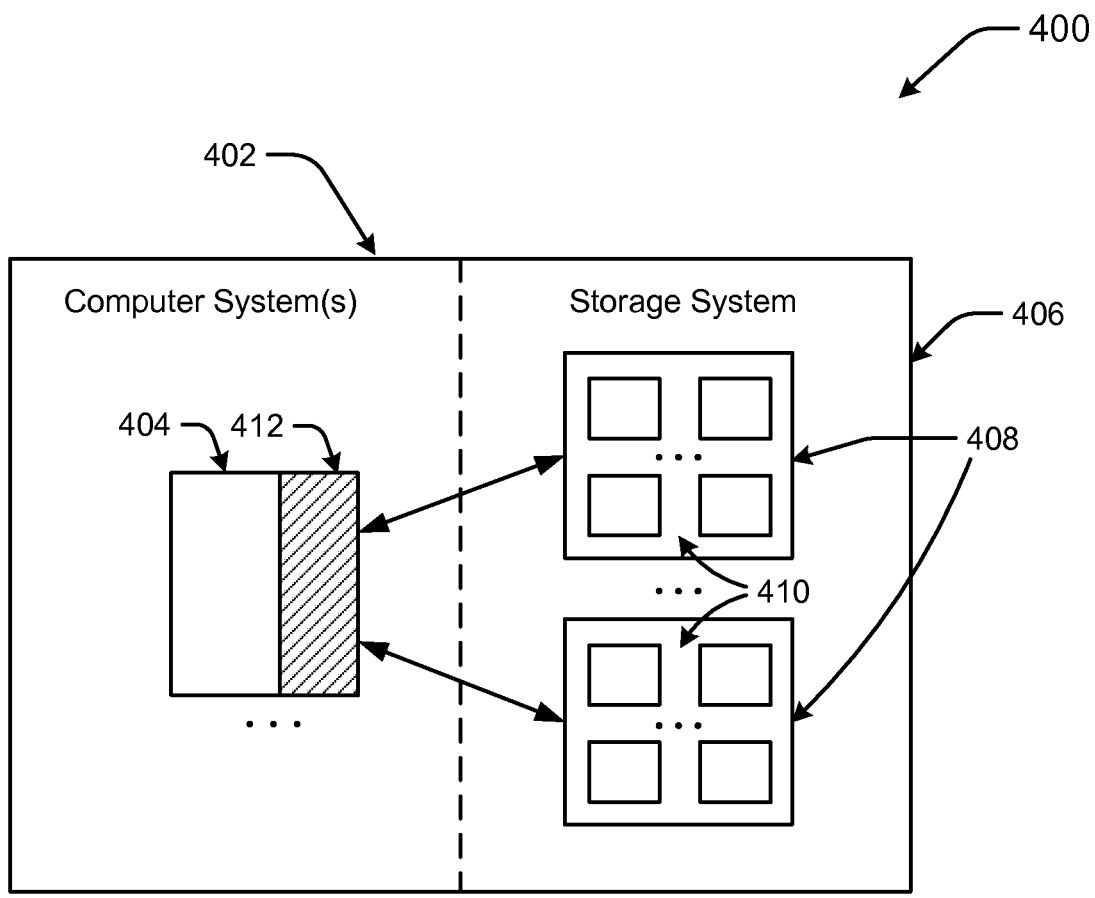
FIG. 4 illustrates an example of an environmental configuration that can be used in accordance with at least one embodiment.

The key(s) may be persisted in any number of locations along the data path between the customer entity and the storage device(s) of the storage system, and it will be appreciated that each given location along this path has different inherent qualities with respect to ease of use, performance, security of data, and the like. For example, when the key is persisted closer to the storage device end of the data path (as discussed in FIG. 1), the erasure and/or inaccessibility of the data may be relatively more verifiable than if the key is persisted on or closer to a customer entity, which may favor performance and/or usability of such secure erasure abilities. FIG. 4 illustrates an example environment 400 in accordance with at least one embodiment where one or more keys 412 are persisted on the customer entity 404. In this example, one or more computer systems 402 are used to implement one or more customer entities, which connect to one or more storage nodes 408 of a storage system 406, each node comprising one or more storage devices 410. The computer systems, customer entities, storage nodes, storage system and storage devices are, in various embodiments, similar to those previously discussed at least in connection with FIGS. 1 and 3. Similarly, the key(s) may have characteristics, configurations, and/or origins previously described in connection with at least FIG. 3. Thus, it will be appreciated that, in some embodiments, various components previously described, such as cryptographic entities, may be incorporated as appropriate.

In some embodiments, one or more key(s) are persisted by a customer entity. In some embodiments, the one or more key(s) are persisted by a user of the computer system. Such key(s) may, in some embodiments, be part of a cryptographic implementation including additional keys, all or some combination of which are required for the customer entity to decrypt and/or access data stored upon the storage system, similarly to that which is discussed above in connection with at least FIG. 3. In some embodiments, when the customer entity connects with the storage system or aspects thereof, e.g. by attaching to a volume described above in connection with at least FIGS. 1, 2 and 3, the persisted key is copied to or otherwise stored upon volatile memory of some entity of the computer system(s) or storage system for the duration of the connection. For example, a customer entity may, upon attaching to a volume, pass a persisted key to a storage node, a cryptographic entity, or other device of the storage system. In some embodiments, the user of a customer entity persists the key locally, and provides (either automatically or upon request of the computer system(s) or storage system, e.g. as a precondition to connecting with an entity of the storage system) the key to be stored upon volatile memory of the customer entity. In some embodiments, the customer entity persists the key, and upon connecting with and/or attaching to a volume, passes the key to an entity of the storage system to be stored on volatile memory stored thereto. In some embodiments, while the customer entity is connected to the storage system (e.g., a volume), the key(s) stored in volatile memory is used to provide decyprtion and/or access to the data.

In some embodiments, upon disconnection by the customer entity from the storage system, whether requested, inadvertent, or initiated by any entity, the key(s) stored in volatile memory are allowed to dissipate such that at least the operator or provider of the computer system(s) and/or the storage system are unable to access the stored data. Thus, in such embodiments, control over and/or access to the data stored on the storage system may be permanently disabled by, e.g., the cryptographic zeroization of the persisted key. In some embodiments where the key is persisted by a user or a customer entity, the user and/or the owner of the customer entity, as applicable, has control over the disposition of the data, including its secure erasure. In some embodiments, methodologies regarding the notification, dissemination of information about data disposition, and various request mechanisms are similar to those described in connection with at least FIGS. 1 and 3.

Figure 5:
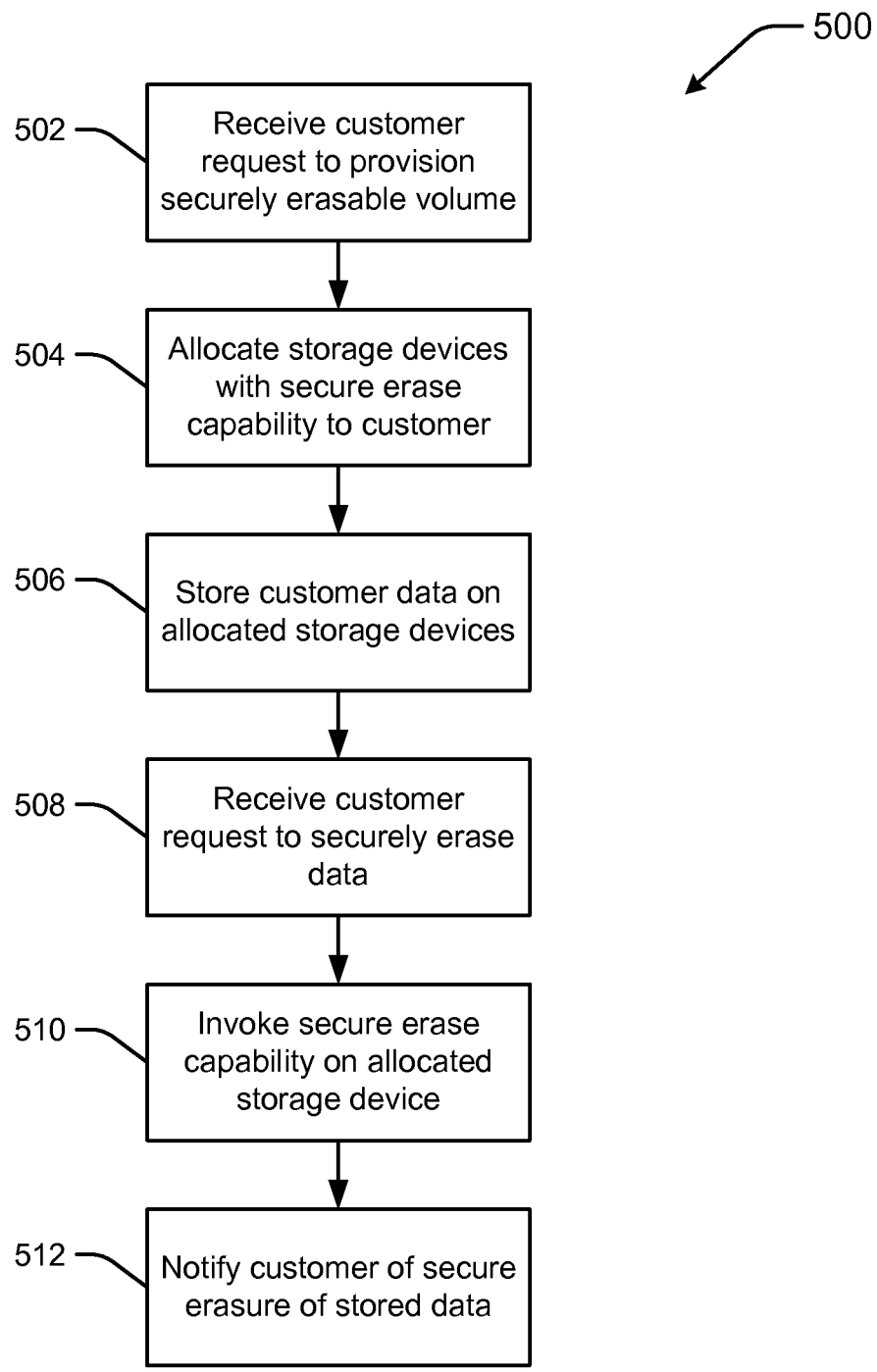
FIG. 5 illustrates an example process for securely erasing stored data in accordance with at least one embodiment.

FIG. 5 illustrates an example process 500 for servicing requests to securely, verifiably and/or permanently disable access to data using, e.g., self-encrypting or secure erase-capable storage devices. As described in connection with various entities described in the preceding figures, any appropriate aspect of the computer system(s), storage system, or of third parties (e.g., users of customer entities) may service such requests by incorporating some of the techniques discussed at least in FIGS. 1, 2 and 3. Some or all of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In the illustrated example, an entity receives a customer request (or customer-authorized request) to provision a securely erasable volume 502. As previously discussed in connection with at least FIGS. 1 and 3, such a request may originate from and be received by any appropriate entity, including the customer entity itself, components and/or entities of the computer system(s), and/or components and/or entities of the storage system. The customer may explicitly or inherently authorize such requests, such as when the customer entity connects with a storage server that enforces a policy requiring all data stored thereon to be encrypted. The entity receiving the request allocates, or requests to have allocated, storage devices with secure erasure or similar capability 504. As previously discussed at least in connection with FIGS. 1 and 3, such storage devices may include SSDs, self-encrypting hard disk drives, and the like. Also as previously discussed, the firmware and/or hardware of storage devices may be modified or adapted to support different aspects of the secure erasure capability, such as control over granularity, modification of the secure erasure or similar ability, and the like. Such devices, as previously alluded, may in some embodiments be exclusively allocated to the requesting customer entity, and in some embodiments, are abstracted by a volume to which the customer entity connects. Upon allocating the storage devices, customer data is stored thereon 506. As previously alluded to in connection with FIG. 3, pre-existing customer data may be moved to the newly allocated, e.g., volume as part of step 506, or in the alternative, only customer data stored after creation of the volume may be, e.g., securely erasable. Upon receiving a customer request or customer-authorized request to securely erase or otherwise permanently disable access to the customer data 508, the receiving entity invokes, or causes to be invoked, the secure erase or similar ability of the allocated storage devices 510. As previously discussed in connection with FIGS. 1 and 3, the request may be sent by any appropriate entity, including the customer entity itself, and processed and/or received by any appropriate entity, also including the customer entity. Similarly to previously discussed, the secure erase capability may be invoked using device-supported, hardware-based commands, and both the request and the attendant device commands may be queued if they are incapable of being processed within a predetermined period of time. At least upon completion of such a command, and optionally upon receiving the customer request to securely erase the data, the customer entity or connecting user is notified of the pending, occurring, or completed permanent disablement of access to the stored customer data 512. As previously discussed, such notifications may include information that allow entities to independently verify the data's inaccessibility, and may include and/or be backed by a service-level agreement or similar guarantee.

Figure 6:
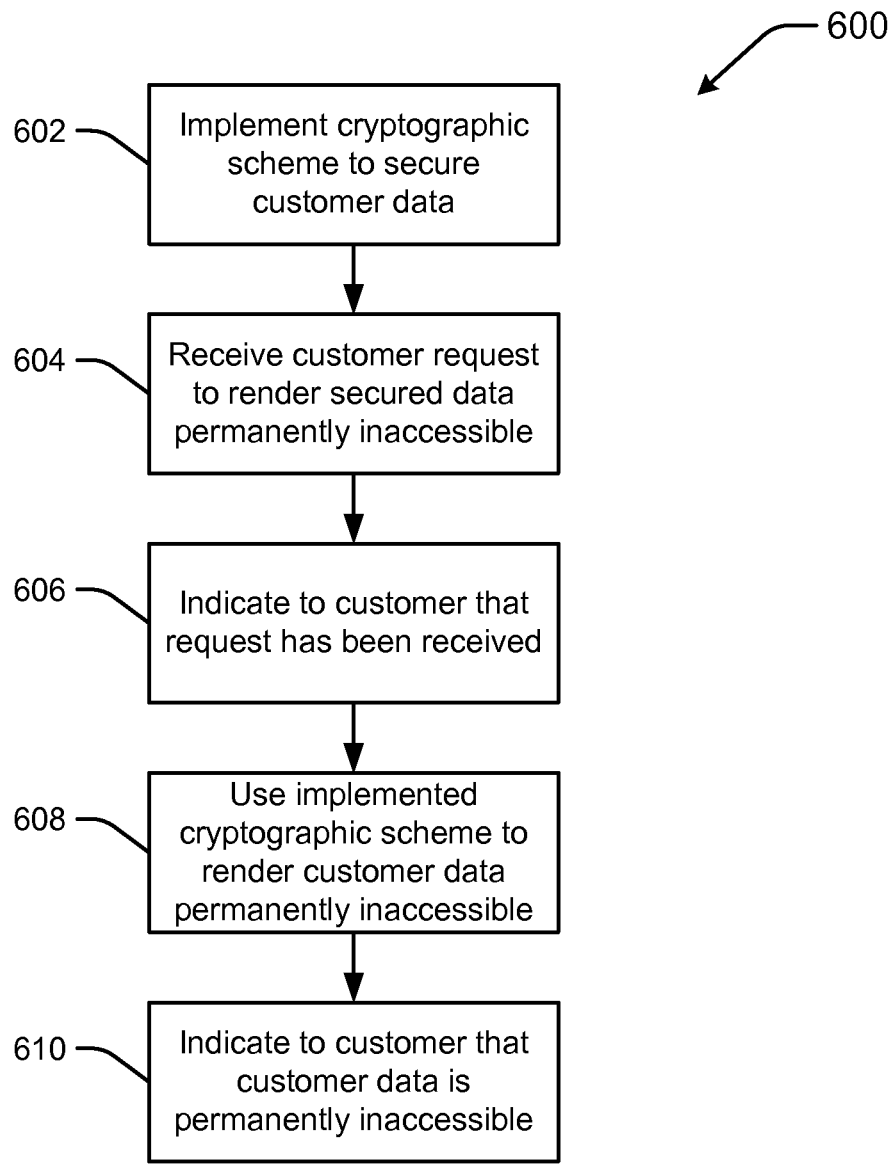
FIG. 6 illustrates an example process for securely erasing stored data in accordance with at least one embodiment.

FIG. 6 illustrates an example process 600 for servicing requests to securely, verifiably and/or permanently disable access to data using, e.g., one or more cryptographic schemes or implementations. As described in connection with various entities described in the preceding figures, any appropriate aspect of the computer system(s), storage system, or of third parties (e.g., users of customer entities) may service such requests by incorporating some of the techniques discussed at least in FIGS. 1, 2, 3, 4 and 5.

In the illustrated example, one or more cryptographic schemes are implemented in order to secure customer data stored upon the storage system 602. As discussed at least in connection with FIGS. 3 and 4, such schemes, in some embodiments, include a discrete cryptographic entity that is implementable by any appropriate entity discussed herein. Exemplary implementations of such an entity, as well as various methodologies to secure data using such an entity, are described at least in connection with FIGS. 3 and 4. It will be appreciated that existing unsecured customer data may be secured, e.g., by moving such data to a volume that is secured using the cryptographic scheme(s), only customer data stored after implementation of the scheme(s) may be subject to the remainder of the process, or some combination therebetween. The implementation of the scheme(s) may be automatic, voluntary or involuntary, and may be initiated by or upon the authorization of an appropriate entity, such as the customer entity storing the customer data to be secured. Upon receiving a customer entity request or customer entity-authorized request to render secured data permanently and/or securely inaccessible 604, the receiving system may acknowledge receipt of the request 606 prior to using aspects of the implemented cryptographic scheme to securely erase or otherwise render the requested, stored customer data permanently inaccessible 608. Examples of the nature of the requests, acknowledgements, and methodologies involved with the secure erasure or permanent disablement of access of stored data are provided at least in connection with FIGS. 1, 2, 3, 4 and 5. For example, one or more cryptographic keys generated by the scheme that are, in isolation or in combination, used to decrypt the encrypted data stored on a volume, may be erased to render the encrypted data permanently inaccessible. In such embodiments, the erasure may be a cryptographic zeroization, as previously discussed. At least upon completion of step 608, the customer entity or connecting user is notified of the pending, occurring, or completed permanent disablement of access to the stored customer data 610. As previously discussed in connection with at least FIGS. 1, 3, 4 and 5, such notifications may include information that allow entities to independently verify the data's inaccessibility, and may include and/or be backed by a service-level agreement or similar guarantee.

Figure 7:
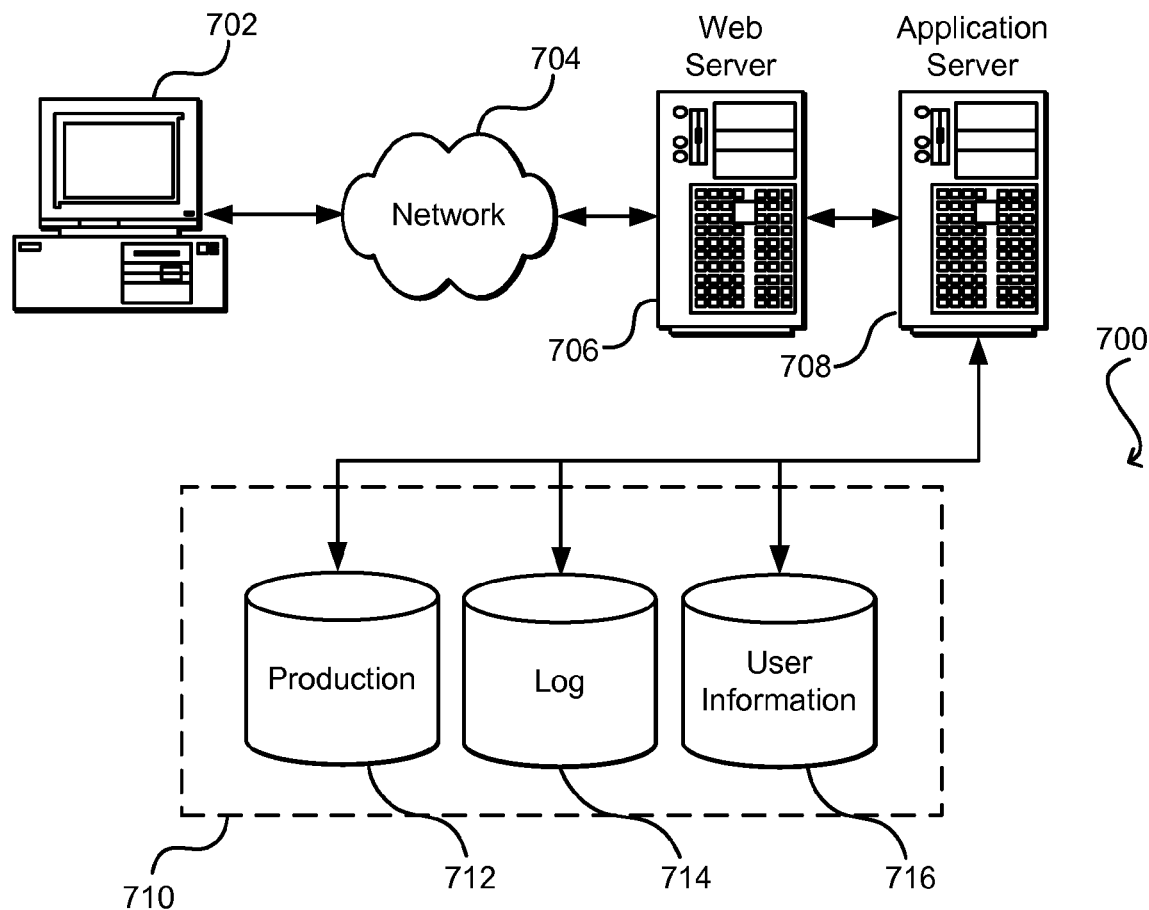
FIG. 7 illustrates an environment in which various embodiments can be implemented.

FIG. 7 illustrates an example of an environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases, or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out various embodiments. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for modifying access to data, comprising:
   under the control of one or more computer systems configured with executable instructions:
   storing data in a volume comprising at least one networked storage node among a plurality of networked storage nodes of a storage system, the volume and the data each being accessible to a customer entity of the one or more computer systems, the customer entity being of a plurality of customer entities within a distributed computing system and implemented by the distributed computing system;
   encrypting, using a cryptographic key implemented by a cryptographic entity that is at least communicatively connected to the one or more computer systems, at least a subset of the data stored upon the volume, such that the cryptographic key is necessary to decrypt at least the encrypted subset of data; and
   upon receiving, from the customer entity, a request to render permanently inaccessible the encrypted subset of data, at least:
   responding to the customer entity with at least an indication that the request has been received;
   permanently discarding the cryptographic key; and
   indicating to the customer entity that the encrypted subset of data is permanently inaccessible.

2. The computer-implemented method of claim 1, wherein:
   at least one algorithm used to generate the cryptographic key is not practicable, at the time the cryptographic key is created, to predict by unauthorized users; and
   the encrypted subset of data is not practicable to decrypt without at least knowledge of the cryptographic key.

3. The computer-implemented method of claim 1, wherein the cryptographic entity is a separate entity from the customer entity and each of the plurality of networked storage nodes.

4. The computer-implemented method of claim 1, wherein:
   the cryptographic entity periodically generates a new at least portion of the cryptographic key; and
   the customer entity is required to periodically obtain the generated new at least portion of the cryptographic key in order to retain an ability to decrypt the encrypted subset of data.

5. The computer-implemented method of claim 1, wherein the request to render the encrypted subset of data permanently inaccessible is automatically generated when the customer entity disconnects from the volume.

6. The computer-implemented method of claim 1, wherein the cryptographic entity comprises at least one hardware device.

7. The computer-implemented method of claim 1, wherein indicating to the customer entity includes a notification comprised of verbiage that indicates a guarantee that the encrypted subset of data is permanently inaccessible.

8. A computer-implemented method for controlling data storage devices, comprising:
under the control of one or more computer systems configured with executable instructions,
encrypting, using a cryptographic implementation that is implemented by a cryptographic entity, at least a subset of data stored upon storage resources of a storage system, the data being accessible, at least by using the cryptographic implementation to decrypt the data, to a customer entity of the one or more computer systems, the customer entity selected from a plurality of customer entities within a distributed computing system and implemented by the distributed computing system; and
upon receiving, from the customer entity, the storage system or the one or more computer systems, a request to render permanently inaccessible the encrypted subset of data, at least:
modifying, such that the decryption of the data becomes infeasible, the cryptographic implementation by at least:
determining at least one cryptographic key used to encrypt the data; and
permanently removing at least access to the at least one cryptographic key; and
indicating to the customer entity that the encrypted subset of data is permanently inaccessible.

9. The computer-implemented method of claim 8, wherein the cryptographic implementation includes the generation of at least one cryptographic key, the at least cryptographic key being used, at least in part, to encrypt or decrypt the data.

10. The computer-implemented method of claim 8, wherein the cryptographic entity is controlled, at least in part, by the customer entity.

11. The computer-implemented method of claim 8, wherein the customer entity is required to submit at least an aspect of the cryptographic implementation to the cryptographic entity in order to gain access to the encrypted subset of data.

12. The computer-implemented method of claim 8, wherein:
the cryptographic entity periodically changes at least an aspect of the cryptographic implementation; and
the customer entity is required to periodically obtain at least the changed aspect of the cryptographic implementation in order to retain an ability to decrypt the encrypted subset of data.

13. The computer-implemented method of claim 8, wherein the customer entity connects to the one or more computer systems using a second cryptographic implementation that differs from the cryptographic implementation implemented by the cryptographic entity.

14. A computer system for controlling data storage devices, comprising:
one or more processors; and
memory, including instructions executable by the one or more processors to cause the computer system to at least:
secure, at least by using a cryptographic mechanism, data stored upon a storage system;
provide access to the data for a user authorized at least by the cryptographic mechanism, the access being provided to the user via interaction with a client entity of a plurality of client entities within a distributed environment, the client entity implemented by the distributed environment;
process requests at least authorized by the authorized user to remove all access to the data by at least permanently removing a portion of the cryptographic mechanism such that the data cannot be accessed; and
responding to the requests of the authorized user with at least information indicating that the data is no longer accessible.

15. The computer system of claim 14, wherein:
the cryptographic mechanism includes at least a first cryptographic key and a second cryptographic key;
the first cryptographic key is under control of the authorized user; and
the second cryptographic key is under control of the computer system.

16. The computer system of claim 15, wherein:
the stored data is secured using both the first cryptographic key and the second cryptographic key; and
both the first cryptographic key and the second cryptographic key are required to provide access to the data for the authorized user.

17. The computer system of claim 16, wherein the authorized user request to remove all access to the data is processed by permanently removing, by at least one of the authorized user or the computer system, at least one of the first cryptographic key or the second cryptographic key.

18. The computer system of claim 15, wherein the first cryptographic key and the second cryptographic key are each part of an asymmetric key algorithm implementation included as part of the cryptographic mechanism.

19. The computer system of claim 14, wherein the executable instructions further cause the computer system to at least:
when the requests from the authorized user to remove data access cannot be processed, then queue the data access removal requests such that no other requests relating to the data are processed before the data access removal requests.

20. One or more non-transitory computer-readable storage media having collectively stored thereon executable instructions that, when executed by one or more processors of a computing resource provider's computer system, cause the computer system to at least:
implement a cryptographic system to at least encrypt data stored upon the one or more non-transitory computer-readable storage media;
provide, for a customer entity that is authorized to access the data, access to the data by decrypting the data using at least an aspect of the cryptographic system, the customer entity being of a plurality of customer entities within a distributed computing system and implemented by the distributed computing system;
service requests that are at least authorized by the customer entity to revoke access to the data by at least:
deactivating at least the decrypting aspect of the cryptographic system such that the encrypted data is permanently inaccessible; and
submitting, to the requesting customer entity, information that at least indicates that the encrypted data is permanently inaccessible.

21. The non-transitory computer-readable storage media of claim 20, wherein: the decrypting aspect of the cryptographic system is under control of the customer entity; and
the executable instructions further cause the computer system to at least, while the customer entity is connected to the non-transitory computer-readable storage media, assume control of the decrypting aspect of the cryptographic system.

22. The non-transitory computer-readable storage media of claim 21, wherein while the customer entity is connected to the non-transitory computer-readable storage media, the decrypting aspect of the cryptographic system is stored in volatile memory of the computer system.

23. The non-transitory computer-readable storage media of claim 21, wherein the executable instructions further cause the computer system to at least, when the customer entity disconnects from the non-transitory computer-readable storage media, return control of the decrypting aspect of the cryptographic system to the customer entity.

24. The non-transitory computer-readable storage media of claim 21, wherein: the customer entity comprises one or more resources of the computer system; and the customer entity services the requests of the customer entity to revoke the data access.

* * * * *